United States Patent Office

2,739,905
Patented Mar. 27, 1956

2,739,905

ZIRCONYL 2-ETHYLHEXOATE

Gerry P. Mack, Jackson Heights, and Emery Parker, New York, N. Y., assignors, by mesne assignments, to Carlisle Chemical Works, Inc., Reading, Ohio, a corporation of Ohio No Drawing. Application August 29, 1952, Serial No. 307,153

6 Claims. (Cl. 106—310)

The invention relates to new organic zirconylic compounds, which are useful in drier compositions for drying oils.

Zirconium naphthenate and the zirconium soaps of the higher fatty acids, such as the stearate, palmitate and the like have been prepared but have been found of little use for commercial or technical applications.

We have found that the 2-ethylhexoic acid derivatives of zirconylic acid have excellent drying properties and can replace to a considerable extent the conventional manganese, cobalt and lead driers in drier compositions. They have the advantage that they can be used in relatively large quantities also in white paints without producing discoloration.

The new driers can be prepared by the double decomposition of water soluble zirconium salts, for instance zirconium oxychloride or zirconium sodium sulfate, with an alkali 2-ethylhexoate or by the fusion of a water insoluble zirconium carbonate with 2-ethylhexoic acid. After removing unreacted 2-ethylhexoic acid, the obtained reaction product corresponds to the empirical formula:

(1) 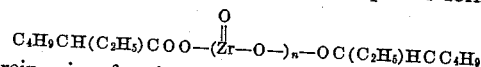

wherein $n$ is a fractional number between 1 and 2.

The reaction product represents a mixture or complex of two zirconylic acid compounds:

(2)      O=Zr[OOCCH($C_2H_5$)$C_4H_9$]$_2$
Molecular weight: 393.6
Zirconium=23.17% and (3) 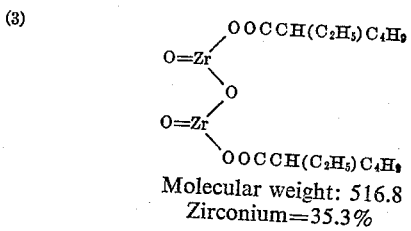
Molecular weight: 516.8
Zirconium=35.3%

The value of $n$ in Formula 1 depends on the ratio of these two compounds (2) and (3) in the reaction product. We were not able to separate the product (1) into the compounds (2) and (3) simply by extraction or fractional crystallization as the components have apparently identical solubility properties in various solvents. The ratio of (2) to (3), however, can be varied and depends on the conditions of the reaction, the temperature of drying and other factors. For instance, if the product is prepared by a double decomposition reaction and extracted with methyl alcohol to remove the 2-ethylhexoic acid, the ratio of compound (2) to compound (3) is about 80:20. If the same product is dried in vacuo at temperatures exceeding 100° C., the ratio can be changed to 40:60.

If a solution of the compound is extracted with methanol and then distilled under reduced pressure, the resulting product has almost entirely the composition of Formula 3. Also this product is still completely soluble in hydrocarbons. If the Zr content of the products is raised further to more than 35.3 per cent, i. e. beyond the dimer stage, the products are no longer completely soluble and of no value for the use as driers.

The following examples are given to illustrate the preparation and characteristics of the new compound.

Example 1

To .5 mol of zirconium oxychloride containing 8 mols of crystal water dissolved in 200 cc. of water was added at room temperature a neutral solution of 1 mol of 2 ethylhexoic acid neutralized with 1 mol of caustic soda, under stirring. The semi-solid paste which separated out was dissolved in petroleum ether, the solution filtered and the solvent removed by distillation. The sticky white solid residue contained 21.5 per cent of zirconium and corresponded to a mixture of a product of the formula $$(ZrO_2)_nO(OC(C_2H_5)HCC_4H_9)_2$$

with free 2-ethylhexoic acid. If this product was digested with cold methyl alcohol to dissolve out the acid and the methyl alcohol insoluble solid was separated and dried, the zirconium content of the dried product was 24.7% and its content of chemically bound 2-ethylhexoic acid was 70.5 per cent ($n=1.10$). This product was therefore essentially the zirconyl compound of Formula 2 with a small admixture of the dizirconyl compound of Formula 3. If this extracted and dried product was further dried at 105° C. for 24 hours, the zirconium content was further increased to 25.35 per cent and the 2-ethylhexoic acid content was 69.7 per cent ($n=1.19$). All these products were completely soluble in cold aliphatic and aromatic hydrocarbons.

If the methanol extracted product ($n=1.19$) was subjected to high temperature under reduced pressure, such as 200° C. and 2 mm., for 4 hours, and the volatile liquid was condensed, the residual zirconium compound contained 29.9% zirconium. The 2-ethylhexoic acid content was 62.5 per cent and the complex corresponded to the above formula where $n$ represents a numeral of 1.57. The volatile condensed compound was 2-ethylhexoic acid.

Example 2

.4 mol=154 g. of sodium zirconium sulfate containing 49.2 g. of zirconium oxide were dissolved in cold water, and to this solution was added without heating a neutral solution of sodium 2-ethylhexoate prepared by neutralizing 116 g. of 2-ethylhexoic acid with 32 g. of caustic soda. The precipitate was worked up as outlined in Example 1, and the product obtained analyzed 22.3 per cent zirconium. When this product was extracted with warm methanol, the zirconium content of the residual solid was 26.45 per cent of the 2-ethylhexoic acid content 66.6 per cent; therefore, it corresponded to the formula 1 with $n=1.32$.

Example 3

1 mol (=385 g.) of sodium zirconium sulfate was dissolved in 800 cc. of water. To the clear solution was added 1 mol of dry sodium carbonate dissolved in cold water. A suspension of basic zirconium carbonate was formed, and 1.8 mols of 2-ethylhexoic acid were slowly added under vigorous mixing. The zirconium salt of 2-ethylhexoic acid separated out and was dissolved in a low boiling aliphatic hydrocarbon, freed from water and filtered from impurities; then, the solvent was removed under reduced pressure. The obtained zirconyl compound contained 25.5 per cent of zirconium and 69 per cent of 2-ethylhexoic acid. This compound was redissolved in toluol, and methanol was added to the clear toluol solution until two layers were formed, the upper layer consisting essentially of free 2-ethylhexoic acid dissolved in methanol. On further addition of methanol no separation took place in the upper layer. The lower toluol layer which contained almost entirely the zirconyl compound was separated and the toluol removed by distillation. The white solid residue was again digested with hot methanol and a powdery solid was obtained which contained 34.15 per cent of zirconium and 56.2 per cent of 2-ethylhexoic acid and consisted essentially of the dimeric compound (3). The product is perfectly soluble in hydrocarbon solvents.

*Example 4*

This example is given to show the preparation and application of drier compositions containing zirconium 2-ethyl hexoate in mixture with cobalt or manganese 2-ethyl hexoate, which compositions can be directly used as drier in drying oil compositions.

To 100 g. ASTM linseed oil was added the proper amount of manganese and cobalt 2-ethylhexoate in form of a solution containing 6.0 per cent metal in mineral spirit, and a solution of the zirconium compound prepared in Example 3 and dissolved in mineral spirit to a solution containing 6.0 per cent zirconium metal, according to the following table. The dust free drying times are recorded in minutes.

| ASTM Linseed Oil, g | 100 | 100 | 100 | 100 | 100 | 100 | 100 |
|---|---|---|---|---|---|---|---|
| Manganese Metal, percent | 0.03 | 0.025 | 0.02 | 0.015 | 0.01 | 0.005 | 0.0 |
| Zirconium Metal, percent | 0.0 | 0.005 | 0.01 | 0.015 | 0.02 | 0.025 | 0.03 |
| Drying Time, min | 300 | 300 | 300 | 300 | 308 | 330 | over 720 |

| ASTM Linseed Oil, g | 100 | 100 | 100 | 100 | 100 | 100 | 100 |
|---|---|---|---|---|---|---|---|
| Cobalt Metal, percent | 0.03 | 0.025 | 0.020 | 0.015 | 0.010 | 0.005 | 0.0 |
| Zirconium Metal, percent | 0.0 | 0.005 | 0.010 | 0.015 | 0.020 | 0.025 | 0.03 |
| Drying Time, min | 240 | 240 | 240 | 245 | 270 | 420 | over 720 |

If the same amounts of manganese and cobalt are used as in above tables, but without zirconium the following results are obtained:

| ASTM linseed oil, g | 100 | 100 | 100 | 100 | 100 |
|---|---|---|---|---|---|
| Manganese Metal, percent | 0.03 | 0.025 | 0.02 | 0.015 | 0.010 |
| Drying Time, percent | 300 | 310 | 330 | 420 | over 720 |

| ASTM linseed oil, g | 100 | 100 | 100 | 100 | 100 | 100 | 100 |
|---|---|---|---|---|---|---|---|
| Cobalt Metal, percent | 0.03 | 0.025 | 0.020 | 0.015 | 0.010 | 0.005 | |
| Drying Time, min | 240 | 265 | 300 | 360 | over 720 | | |

In view of the fact that zirconium 2-ethylhexoate alone in even larger amounts as indicated in above tables does not produce a dry oil film, and the oil films are tacky even after 24 hours, the enhancing action of the zirconium 2-ethylhexoate is clearly demonstrated.

As will be noted on consideration of the tables, the useful mixtures contain a ratio of about 5 to 80 per cent of Zr to 95 to 20 per cent of Mn and of about 5 to 60 per cent of Zr to 95 to 40 per cent of Co, calculated on the metal content.

*Example 5*

Compositions containing the desired amount of zirconyl 2-ethylhexoate combined with manganese and/or cobalt 2-ethylhexoate can be prepared as follows: 231 g. (0.6 mol) of sodium zirconyl sulfate and 62 g. (0.4 mol) of cobaltous sulfate are dissolved in 800 cc. of cold water. 288.4 g. (2 mol) of 2-ethylhexoic acid neutralized with 80 g. of caustic soda in 300 cc. of water are added under stirring to the sulfate solution; the precipitate is washed with cold water and then with cold methanol. The obtained composition can be worked up directly to a drier solution containing the desired drier concentrations and ratios for use as described in Example 4. For this purpose the composition is dissolved in mineral spirits, dehydrated by heating to about 120° C. and filtered. The filtered solution is then diluted with mineral spirits to a content of 6% metal in the form of 3.6% of zirconium and 2.4% of cobalt.

In an identical manner the mixed manganese-zirconium 2-ethylhexoate can be prepared containing after dilution 4.8% of zirconium and 1.2% of manganese, or whatever ratios are desired.

What we claim is:

1. As a new composition of matter, a mixture comprising manganese 2-ethylhexoate and zirconyl 2-ethylhexoate in a ratio of about 95 to 20 per cent of Mn to about 5 to 80 per cent of Zr, calculated on the metal content by weight.

2. As a new composition of matter, a mixture comprising cobalt 2-ethylhexoate and zirconyl 2-ethylhexoate in a ratio of about 95 to 40 per cent of Co to about 5 to 60 per cent of Zr, calculated on the metal content by weight.

3. As a new composition of matter, a mixture comprising zirconyl 2-ethylhexoate, manganese 2-ethylhexoate and cobalt 2-ethylhexoate in a ratio of about 5 to 75 per cent of Zr to about 95 to 25 per cent of combined Mn and Co, calculated on the metal content by weight.

4. As a new composition of matter, useful in drier compositions for drying oils, zirconium compounds of 2-ethylhexoic acid, in which 2-ethylhexoic acid radicals are bound to the zirconyl group =Zr=O.

5. As a new composition of matter, useful in drier compositions for drying oils, zirconyl 2-ethyl hexoate of the formula

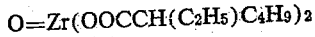

$$O=Zr(OOCCH(C_2H_5)C_4H_9)_2$$

6. As a new composition of matter, the dizirconyl derivative of 2-ethylhexoic acid of the formula

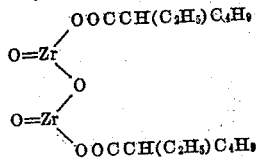

References Cited in the file of this patent

UNITED STATES PATENTS

| 2,132,997 | Plechner | Oct. 11, 1938 |
| 2,221,975 | Kinzie et al. | Nov. 19, 1940 |
| 2,573,049 | Olson | Oct. 30, 1951 |
| 2,584,041 | Nowak et al. | Jan. 29, 1952 |